United States Patent [19]

Glock et al.

[11] Patent Number: 4,837,301

[45] Date of Patent: Jun. 6, 1989

[54] PROCESS FOR THE PREPARATION OF HIGH MOLECULAR WEIGHT OPTIONALLY BRANCHED POLYARYLENESULPHIDES

[75] Inventors: Volker Glock; Wolfgang Ebert; Rolf-Volker Meyer, all of Krefeld, Fed. Rep. of Germany

[73] Assignee: Bayer Aktiengesellschaft, Leverkusen, Fed. Rep. of Germany

[21] Appl. No.: 142,186

[22] Filed: Jan. 6, 1988

[30] Foreign Application Priority Data

Jan. 16, 1987 [DE] Fed. Rep. of Germany ....... 3701068

[51] Int. Cl.$^4$ ............................................. C08G 75/14
[52] U.S. Cl. ................................................... 528/388
[58] Field of Search .......................................... 528/388

[56] References Cited

U.S. PATENT DOCUMENTS 4,490,522 12/1984 Kawabata et al. .................. 528/388
4,535,149 8/1985 Ebert et al. ......................... 528/388

FOREIGN PATENT DOCUMENTS 3529498 2/1987 Fed. Rep. of Germany ...... 528/388

Primary Examiner—Harold D. Anderson
Attorney, Agent, or Firm—Connolly and Hutz

[57] ABSTRACT

This invention relates to a process for the preparation of high molecular weight, optionally branched polyarylenesulphides from alkali metal sulphides, optionally in admixture with alkali metal hydrogen sulphides and aromatic dihalogen compounds, in a polar solvent in the presence of from 0.1 to 6.0 mol-%, preferably from 0.25 to 4.0 mol-%, of an aromatic monoalkoxy or monoalkylthio compound. The polyarylenesulphides obtained have reproducibly adjustable melt viscosities and molecular weights and are distinguished by their reduced tendency to corrosion.

6 Claims, No Drawings

PROCESS FOR THE PREPARATION OF HIGH MOLECULAR WEIGHT OPTIONALLY BRANCHED POLYARYLENESULPHIDES

This invention relates to a process for the preparation of high molecular weight, optionally branched polyarylenesulphides (PPS) from alkali metal sulphides, optionally in admixture with alkali metal hydrogen sulphides and aromatic dihalogen compounds in a polar solvent in the presence of from 0.1 to 6.0 mol-%, preferably from 0.25 to 4.0 mol-%, of an aromatic monoalkoxy or monoalkylthio compound. The polyarylenesulphides obtained have reproducibly adjustable melt viscosities and molecular weights and are distinguished by their reduced tendency to corrosion.

Polyarylenesulphides and methods of preparing them are known, see, for example, U.S. Pat. Nos. 2,513,188, 3 117 620 and 3 354 129.

It is known, for example, that the addition of inorganic or organic salts to the reaction mixture contributes to a lowering of the melt flow or an increase in the melt viscosity of the polyphenylenesulphides obtained. It is only at sufficiently high melt viscosities that polyphenylenesulphides can be worked up thermoplastically, e.g. to injection moulded parts, films and fibres, and a separate and additional after-condensation or curing may therefore be necessary.

From DE-OS No. 3 120 583 it is known to obtain polyarylene sulphides with high melt viscosities by the addition of N,N-dialkyl-carboxylic acid amides to the reaction mixture.

The known processes have the disadvantage that for adjusting the molecular weights to particular values, p-dichlorobenzene must be used in the appropriate excess or the reaction must be stopped after a particular length of time. The resulting polyphenylenesulphides, however, suffer from increased corrosion during the thermoplastic processing. The polymers obtained frequently do not have sufficient stability in the molten state. In particular, the high proportion of halogen end groups has an adverse effect on the dielectric strength and tracking resistance of the polyarylene sulphide and of the moulded parts produced therefrom. Moreover, it is difficult to adjust the melt viscosity reproducibly to the desired values.

It has now been found that polyarylenesulphides which have reproducibly adjustable melt viscosities and molecular weights and undergo less corrosion during processing may be obtained by the addition of certain aromatic monoalkoxy or monoalkylthio compounds to the reaction mixture.

The present invention therefore relates to a process for the preparation of optionally branched polyarylenesulphides from (a) 50–100 mol-% of aromatic dihalogen compounds corresponding to formula (I)

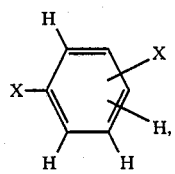

and 0–50 mol-% of aromatic dihalogen compounds corresponding to formula (II)

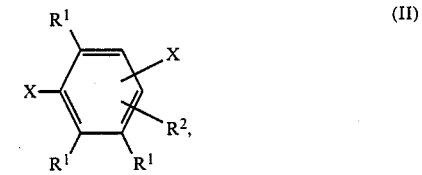

wherein
X denotes halogens such as chlorine or bromine in the meta- or para-position to one another and
$R^1$ and $R^2$ may be identical or different and denote hydrogen, $C_1$–$C_4$-alkyl, $C_5$–$C_{10}$-cycloalkyl, $C_6$–$C_{10}$-aryl, $C_7$–$C_{10}$-alkylaryl or $C_7$–$C_{14}$-arylalkyl and two groups $R^1$ in the ortho-position to one another may be linked together to form an aromatic or heterocyclic ring containing up to three hetero atoms such as N, O or S, and one of the groups $R^1$ is in all cases different from hydrogen, and (b) 0–5 mol-%, preferably 0.1–2.5 mol-%, based on the sum of aromatic dihalogen compounds of formulae I and II, of a tri- or tetra-halogen aromatic compound corresponding to the formula $$ArX_n \qquad (III)$$

wherein
Ar denotes an aromatic $C_6$–$C_{14}$ group or a heterocyclic group having from 5 to 14 ring atoms and up to three ring carbon atoms may be replaced by hetero atoms such as N, O or S,
X stands for halogen such as chlorine or bromine and n stands for the number 3 or 4, and (c) 50 to 100 mol-% of alkali metal sulphide, preferably sodium or potassium sulphide or mixtures thereof, e.g. in the form of their hydrates or aqueous mixtures optionally together with small quantities of alkali metal hydroxides such as sodium and potassium hydroxide and 0 to 50 mol-% of alkali metal bisulphide, preferably sodium and potassium hydrogen sulphide or mixtures thereof, in which the molar ratio of (a+b):c may be in the range of from 0.75:1 to 1.25:1, (d) optionally in the presence of reaction accelerators such as alkali metal carboxylates, alkali metal phosphates, alkali metal phosphonates, alkali metal fluorides or alkali metal alkyl sulphonates, optionally in—the presence of N,N-dialkyl-carboxylic acid amides, lactams, amino acids and anhydrides and esters of carboxylic acids, characterised in that aromatic(thio) ethers corresponding to the following formula (IV)

$$A\text{---}X\text{---}R \qquad (IV),$$

wherein
X stands for O or S and
A denotes an aromatic or heterocyclic group having from 6 to 24 carbon atoms and optionally up to 3 carbon atoms may be replaced by hetero atoms such as N, O or S, as represented by the following formulae:

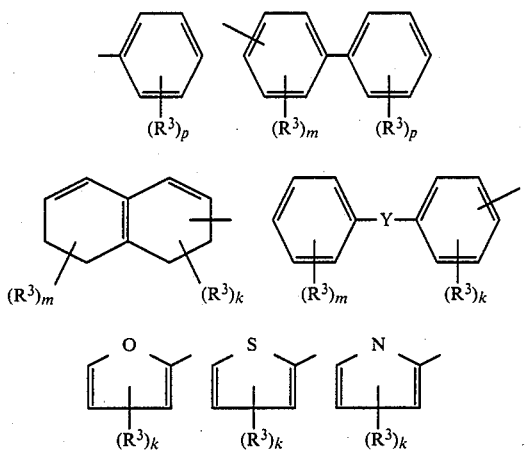

wherein the groups denoted by

R$^3$ are, independently of one another, C$_{1-18}$-alkyl, C$_{7-19}$-alkylaryl/aralkyl, C$_{3-6}$-cycloalkyl, Y denotes C$_1$-C$_6$-alkylidene, C$_{3-6}$-cycloalkylidene, CO, S, SO, SO$_2$, NR, O or a single bond (and R$^3$ has the meaning indicated above)

k stands for the number 0, 1, 2 or 3, m stands for the number 0, 1, 2, 3 or 4, p stands for the number 0, 1, 2, 3, 4 or 5 and R denotes C$_{1-18}$-alkyl or C$_{7-19}$-aralkyl are added to the reaction mixture in quantities of from 0.1 to 6 mol-%, preferably from 0.25 to 4.0 mol-%.

The process according to the invention may be carried out by various methods as follows:

The alkali metal sulphides are preferably used in the form of their hydrates and aqueous mixtures or aqueous solutions. Dehydration may be partial but is preferably complete. The water present in the reaction mixture is removed by distillation, either directly or with the aid of substances which form azeotropic mixtures with water, preferably aromatic dihalogen compounds of formula I and/or II. For the process of dehydration, all the reactants may be mixed together and dehydration may be carried out on the whole mixture, but the alkali metal sulphide may also be dehydrated separately, either with a proportion of the reactants or alone.

Dehydration may be partial but is preferably carried to completion. The water present in the reaction mixture is removed by distillation, either directly or with the aid of azeotropic formers, preferably aromatic dihalogen compounds of formula I and/or II. For the process of dehydration, all the reactants may be mixed together and dehydration may be carried out on the whole mixture, or the alkali metal sulphide may be dehydrated separately, either with a portion of the other reactants or alone.

The monoalkoxy or monoalkylthio aromatic compounds corresponding to formula IV may be added before or during the reaction. Mixtures of monoalkoxy and monoalkylthio aromatic compounds may also be used. The components may be introduced into the reaction by dosing over a certain period of time (e.g. within 0.5 to 2 hours) or they may be added portionwise at certain times of the reaction or the total quantity calculated may be added to the reaction mixture at a particular point in time.

In a preferred embodiment of the reaction, the reactants together with reaction accelerator or a mixture of reaction accelerators and the monoalkoxy or monoalkylthio aromatic compounds of formula IV are continuously brought together in the presence of the polar solvent while water is removed. When this procedure is adopted, any reaction that sets in may be controlled by the rate at which the components are dosed in.

This method also enables prolonged dwell times of water to be avoided.

If complete dehydration is carried out, the reaction may be carried out pressure-free or at a low pressure of up to about 3 bar. Higher pressures, up to 50 bar, may be employed for obtaining higher reaction temperatures, above the boiling point of the solvent or of the mixture of solvent and aromatic dihalogen or polyhalogen compound.

The reaction may be carried out continuously or intermittently. The reaction time may be varied over a wide range. It may extend over 1 to 48 hours, preferably from 1 to 18 hours. The reaction temperatures are from 150° to 300° C., preferably from 170° to 280° C.

The reaction may in addition be carried out in the presence of conventional reaction accelerators, e.g. alkali metal carboxylates (DE-OS No. 2 453 749), lithium halides or alkali metal carboxylates (DE-OS No. 2 623 362), lithium chloride or lithium carboxylate (DE-OS No. 2 623 363), alkali metal carbonates in combination with alkali metal carboxylates (U.S. Pat. No. 4 038 259), lithium acetate (DE-OS No. 2 623 333), trialkali metal phosphates (DE-OS No. 2 930 710), trialkali metal phosphonates (DE-OS No. 2 930 797), alkali metal fluorides (DE-OS No. 3 019 732), alkali metal sulphonates (U.S. Pat. No. 4 038 260), lithium carbonate and lithium borate (U.S. Pat. No. 4 010 518), amino acids (DE-OS No. 3 432 985), anhydrides and esters of carboxylic acids (DE-OS No. 3 432 986) and N,N-dialkyl-carboxylic acid amides.

Para-dihalogenated aromatic compounds are preferably used for the preparation of polyphenylene sulphides which are to be processed thermoplastically.

If branched polyarylenesulphides are to be prepared, at least 0.05 mol-% of a trihalogenated or tetrahalogenated aromatic compound of formula (III) should be used.

The following are examples of dihalogenated aromatic compounds of formula (I) to be used according to the invention: p-dichlorobenzene, p-dibromobenzene, 1-chloro-4-bromobenzene, 1,3-dichlorobenzene, 1,3-dibromobenzene and 1-chloro-3-bromobenzene. These compounds may be used alone or as mixtures with one another. 1,4-Dichlorobenzene and/or 1,4-dibromobenzene are particluarly preferred.

The following are examples of aromatic dihalogenated compounds of formula (II) to be used according to the invention: 2,5-Dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. These compounds may be used alone or as mixtures with one another.

The following are examples of trihalogen and tetrahalogen aromatic compounds of formula (III) to be used according to the invention: 1,2,3-Trichlorobenzene, 1,2,4-trichlorobenzene 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine Any polar solvent in which the organic and optionally also the inorganic reactants are sufficiently soluble under the reaction conditions may generally be used for the reaction. N-alkyllactams are preferred.

The N-alkyllactams used are lactams of amino acids containihg from 3 to 11 carbon atoms, optionally carrying substituents on the carbon structure which are inert under the reaction conditions.

The following are examples of suitable N-alkyllactams:

N-Methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the above-mentioned solvents may be used.

The alkylarylethers and thioethers of formula (IV) to be used according to the invention contain no additional groups which are reactive under the reaction conditions and they are halogen-free. The following, for example, may be used:

Methoxybenzene, ethoxybenzene, propoxybenzene, 2-methyl-methoxybenzene, 3-methyl-methoxybenzene, 4-methyl-methoxybenzene, 2-ethyl-methoxybenzene, 3-ethyl-methoxybenzene, 4-ethyl-methoxybenzene, 2-propyl-methoxybenzene, 3-propyl-methoxybenzene, 4-propyl-methoxybenzene, 2-isopropyl-methoxybenzene, 3-isopropyl-methoxybenzene, 4-isopropyl-methoxybenzene, 2-pentyl-methoxybenzene, 3-pentyl-methoxybenzene, 4-pentyl-methoxybenzene, 2-isopentyl-methoxybenzene, 2-tert.-pentyl-methoxybenzene, 3-tert.-pentyl-methoxybenzene, 4-tert.-pentyl-methoxybenzene, 2-tert.-butyl-methoxybenzene, 3-tert.-butyl-methoxybenzene, 4-tert.-butyl-methoxybenzene, 2-butyl-methoxybenzene, phenyl-benzylether, phenyl-benzylsulphide, 3-butyl-methoxybenzene, 4-butyl-methoxybenzene, 2-sec.-butyl-methoxybenzene, 2-cyclopentyl-methoxybenzene, 3-cyclopentyl-methoxybenzene, 4-cyclopentyl-methoxybenzene, 2-cyclohexyl-methoxybenzene, 3-cyclohexyl-methoxybenzene, 4-cyclohexyl-methoxybenzene, 2-cyclohexyl-4-methyl-methoxybenzene, 2-tert.-butyl-4-methyl-methoxybenzene, 2,3-dimethyl-methoxybenzene, 3,4-dimethyl-methoxybenzene, 2,4-dimethyl-methoxybenzene, 3,5-dimethyl-methoxybenzene, 2,5-dimethyl-methoxybenzene, 3-ethyl-5-methyl-methoxybenzene, 2,3,5-trimethyl-methoxybenzene, 3-methyl-4-(1-methylethyl)-methoxybenzene, 5-methyl-2-(1-methylethyl)-methoxybenzene, 4-isooctyl-methoxybenzene, 2-nonyl-methoxybenzene, 3-nonyl-methoxybenzene, 4-nonyl-methoxybenzene, 2,4-di-tert.-butyl-methoxybenzene, 2-dodecyl-methoxybenzene, 3-dodecyl-methoxybenzene, 4-dodecyl-methoxybenzene, 1-methoxy-5,6,7,8-tetrahydro-naphthalene, 1,1,3,3-tetramethyl-5-methoxyindane, 1-methoxy-naphthalene, 2-methoxy-naphthalene, 2-methoxy-biphenyl, 3-methoxy-biphenyl, 4-methoxy-biphenyl, 2-methoxy-diphenylmethane, 4-methoxy-diphenylmethane, 4-(1-methoxydiphenyl)ether, 4-methoxy-diphenylsulphone, 4-methoxy-diphenylsulphide, methyl-phenyl-sulphide, ethyl-phenyl-sulphide, methyl-(4-methylphenyl)-sulphide, methyl-(2-methylphenyl)-sulphide, methyl-(3-methylphenyl)-sulphide, 2-(methylthio)-naphthalene, 1-(methylthio)-naphthalene, 2-(methylthio)-diphenylsulphide and 4-(methylthio)-diphenylsulphide.

The following are preferred: Methoxybenzene, 4-methyl-methoxybenzene, 4-ethyl-methoxybenzene, 4-t-butyl-methoxybenzene, 4-cyclohexyl-methoxybenzene, 4-isooctyl-methoxybenzene, 4-nonyl-methoxybenzene, 4-dodecyl-methoxybenzene, 1-methoxynaphthalene, 2-methoxynaphthalene, methyl-phenyl sulphide, methyl-(4-methylphenyl)-sulphide, 1-(methylthio)-naphthalene, and 2-(methylthio)-naphthalene.

The following are particularly preferred: Methoxybenzene, 4-methyl-methoxybenzene, 4-isooctyl-methoxybenzene, 4-nonyl-methoxybenzene, 2-methoxy-naphthalene, methyl-phenyl sulphide and methyl-(4-methylphenyl)-sulphide.

Mixtures of the monoalkoxy aromatic compounds and mono(alkylthio) aromatic compounds of formula (IV) may be used.

Working up of the reaction mixture and isolation of the polyphenylene sulphide may be carried out in a known manner.

The polyarylenesulphide may be removed from the reaction solution by known methods such as filtration or centrifuging, either directly or after the addition of water and/or dilute acids or organic solvents in which the polyarlyene sulphides are only sparingly soluble. Separation of the polyarylenesulphide is generally followed by washing with water. Washing or extraction with other washing liquids may be carried out in addition to or after the washing with water.

The polyarylenesulphide may also be obtained by, for example, removal of the solvent by distillation followed by washing, as described above.

The polyarylenesulphides prepared according to the invention are distinguished by their clearly defined melt viscosities, which depend on the amount of chain breaking agent contained in them and are reproducible. This is important in that for processing the polyarylenesulphides, it is necessary to adjust the polymer melt to different viscosities which must be adapted to the particular purpose for which they are to be used.

Thus for the production of films and fibres it may be advantageous to obtain higher melt viscosities than those required for injection moulded parts reinforced with glass fibres or glass fibres and minerals.

Another advantage of the polyarylenesulphides prepared according to the invention is their great stability under thermal stress.

It is only this stability which ensures that thermoplastic processing will not be accompanied by any further polymerisation or degradation which could lead to a complete change in the properties of the product and it also means that regenerated product can be used as new after the product has been processed.

Moreover, the corrosion which generally occurs during thermoplastic processing or on contact of the PPS melts with metal surfaces and which leads to contamination of the PPS and excessive wear of manufacturing and processing machines is greatly reduced in the polyphenylene sulphides according to the invention even when they are subjected to great thermal stress.

The polyarylenesulphides according to the invention may be mixed with other polymers and with pigments and fillers such as graphite, metal powders, glass powder, quartz powder, glass fibres or carbon fibres or they may be treated with the usual additives employed for polyarylenesulphides, such as conventional stabilizers amd mould release agents.

After isolation from the reaction mixture, the polyarylenesulphides according to this invention have melt viscosities of from 1 to $5 \times 10^3$, preferably from 5 to $10^3$ Pa.s. They may be worked up by the usual processes to produce films, fibres and, preferably, injection moulding compositions. These may be used, for example, as motor car parts, mountings and fittings, electrical parts such as switches, electronic panels, chemically resistant and weather-resistant parts and apparatus such as pump housings and pump impellers, dishes for etching baths, sealing rings, parts of office machinery and telecommunication equipment and household appliances, valves, ball-bearing parts, embedding masses for electronic parts, etc.

Melt viscosity

The melt viscosity $\eta_m$ of the polymer melt (in Pa.s) was determined by means of a rheometer Model 3250 of Instron at 306° C. in dependence upon the shearing stress (in Pa). The melt viscosities indicated were measured at a shearing stress of $\lambda = 10^2$ Pa.

Corrosion

Corrosion was determined by titration of the acid discharge gases from the corresponding polyphenylenesulphide samples in an air stream at 350° C. over a period of one hour. The corrosion factor $f_{corr.}$ is given by $f_{corr.}$ = Corrosion value of the given example/Corrosion value of comparison example 1

Example 1

2675 g of N-methylcaprolactam, 1209 g of p-dichlorobenzene and 30.5 g (3 mol-%) of p-methylanisole were introduced into a 6 l vessel equipped with stirrer and distillation attachment and the reaction mixture was heated to 220° C. A hot mixture of 1156 g of sodium sulphide trihydrate (about 60%), 133 g of caprolactam, 325 g of water and 4 g of 45% NaOH is added within 3 hours at such a rate that a reaction temperature of 215° C. can be maintained. During introduction of the reactants, the water is removed from the reaction at the same time.

The reaction is then kept under reflux for a further 9 hours. The polyphenylenesulphide is then precipitated in water, washed free from electrolyte and briefly extracted with an organic solvent.

The dried p-polyphenylenesulphide has a melt viscosity of 7.3 Pa.s and a corrosion factor of $f_{corr.} = 0.88$.

Examples 2-7

The experiments were carried out by a method analogous to that of Example 1. The additives used and the properties of the polyphenylenesulphides obtained are shown in the following Table.

| Example | Additive | Quantity/mol - % | $\eta_m$(Pa.s) | $f_{corr.}$ |
|---|---|---|---|---|
| 2 | p-methylanisole | 1 | 28 | 0.71 |
| 3 | " | 0.5 | 155 | 0.84 |
| 4 | 2-methoxynaphthalene | 0.75 | 60 | 0.79 |
| 5 | thioanisole | 0.75 | 33 | 0.85 |
| 6 | anisole | 0.5 | 145 | 0.88 |
| 7a | " | 1 | 30 | 0.68 |
| 7b | " | 1 | 32.5 | 0.78 |
| 7c | " | 1 | 31.5 | 0.72 |

Comparison Example 1 a-c

Same as Example 1 but using a further 24 g (2 mol-%) of p-dichlorobenzene instead of p-methoxyanisole. This experiment was repeated twice. The Table below shows the properties of the polyphenylenesulphides obtained.

|  | $\eta_m$ (Pa.s) | $f_{corr.}$ |
|---|---|---|
| 1 a | 81 | 1 |
| 1 b | 65 | 1 |
| 1 c | 200 | 1.02 |

We claim:
1. Process for the preparation of unbranched or branched polyarylene sulphide from
(a) 50-100 mol-% of aromatic dihalogen compounds corresponding to the following formula (I)

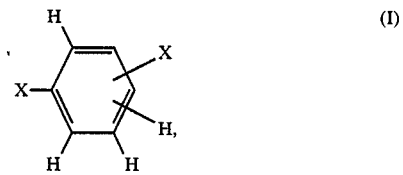

and 0-50 mol-% of aromatic dihalogen compounds corresponding to formula (II)

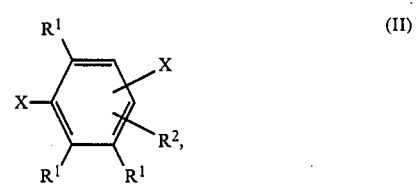

wherein
X denotes halogens in the m- or p-position to one another and
$R^1$ and $R^2$ are identical or different and denote hydrogen, $C_1$–$C_4$-alkyl, $C_5$–$C_{10}$-cycloalkyl, $C_6$–$C_{10}$-aryl, $C_7$–$C_{10}$-alkylaryl or $C_7$–$C_{14}$-arylalkyl or two groups $R^1$ in the ortho-position to one another are joined together to form an aromatic or heterocyclic ring containing up to three hetero atoms and one of the groups $R^1$ is in all cases different from hydrogen, and
(b) 0-5 mol-% based on the sum of aromatic dihalogen compounds of formulae I and II, of a trihalogen or tetrahalogen aromatic compound corresponding to formula (III)

$$\text{ArX}_n \qquad \text{(III)},$$

wherein
- Ar denotes an aromatic $C_6$–$C_{14}$-group or a heterocyclic group having 5 to 14 ring atoms and up to three ring carbon atoms replaced by hetero atoms
- X denotes halogen and
- n represents the number 3 or 4, and
(c) 50 to 100 mol-% of alkali metal sulphide, with or without small quantities of alkali metal hydroxides, and 0 to 50 mol-% of alkali metal bisulphide, in which the molar ratio of (a+b):c is in the range of from 0.75:1 to 1.25:1, with or without a reaction accelerator, characterized in that at least one aromatic (thio)ether compound corresponding to the following formula (IV)

$$A—X—R \qquad (IV)$$

wherein
- X denotes O or S and
- A denotes an aromatic or heterocyclic group having from 6 to 24 carbon atoms with up to 3 carbon atoms replaced by hetero atoms and
- R denotes $C_{1-18}$alkyl or $C_{7-19}$-aralkyl, is added to the reaction mixture in quantites of 0.1 to 6 mol-%.

2. Process according to claim 1, characterised in that the reaction is carried out in the absence of water.

3. Process according to claim 1, characterised in that N-methylpyrrolidone or N-methylcaprolactam or a mixture thereof is used as polar solvent.

4. Process according to claim 1 wherein the amount of component (b) is 0.1 to 2.5 mol-%.

5. Process according to claim 1 wherein the amount of (thio)ether compound is 0.25 to 4.0 mol-%.

6. Process according to claim 1 wherein for the (thio)ether compound of the formula A—X—R, A is

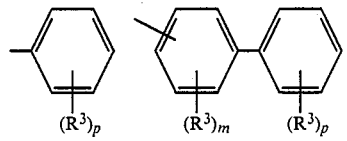

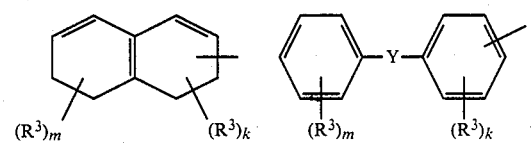

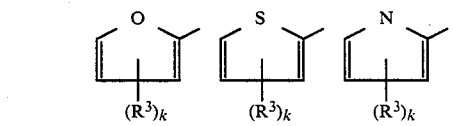

wherein the groups
- $R^3$ denote, independently of one another, $C_{1-18}$-alkyl, $C_{7-19}$-alkylaryl/aralkyl or $C_{3-6}$-cycloalkyl,
- Y denotes $C_{1-6}$-alkylidene, $C_{3-6}$-cycloalkylidene, CO, S, SO, $SO_2$, $NR_3$ or O or Y is a single bond wherein $R^3$ has the meaning indicated above,
- k represents the number 0, 1, 2 or 3,
- m represents the number 0, 1, 2, 3 or 4,
- p represents the number 0, 1, 2, 3, 4 or 5.

* * * * *